United States Patent
Leoni

(10) Patent No.: US 7,657,189 B2
(45) Date of Patent: Feb. 2, 2010

(54) OPTICAL LINK

(75) Inventor: Robert E. Leoni, Somerville, MA (US)

(73) Assignee: Raytheon Company, Waltham, MA (US)

( * ) Notice: Subject to any disclaimer, the term of this patent is extended or adjusted under 35 U.S.C. 154(b) by 778 days.

(21) Appl. No.: 11/016,086

(22) Filed: Dec. 17, 2004

(65) Prior Publication Data

US 2006/0133823 A1  Jun. 22, 2006

(51) Int. Cl.
*H04B 10/04* (2006.01)
*H04B 10/06* (2006.01)

(52) U.S. Cl. .................... 398/183; 398/185; 398/187; 398/200; 398/214

(58) Field of Classification Search .................. 398/183, 398/185, 186, 187, 188, 198, 194, 200, 201, 398/202, 208, 214
See application file for complete search history.

(56) References Cited

U.S. PATENT DOCUMENTS

| | | | |
|---|---|---|---|
| 5,214,524 A * | 5/1993 | Shigematsu et al. ........... 398/79 |
| 5,699,179 A * | 12/1997 | Gopalakrishnan ........... 398/194 |
| 6,175,672 B1 | 1/2001 | Newberg et al. | |
| 6,215,571 B1 | 4/2001 | Yoshida | |
| 6,266,171 B1 * | 7/2001 | Gehlot ....................... 398/161 |
| 6,490,069 B1 * | 12/2002 | Kahn et al. ................. 398/183 |
| 6,819,877 B1 * | 11/2004 | Carter et al. ............... 398/186 |

FOREIGN PATENT DOCUMENTS

WO  WO 02/25843 A1  3/2002

OTHER PUBLICATIONS

PCT/US2005/033568 International Search Report dated Jan. 17, 2006.
Frankart J.P., Boeckx, T., Gilliard J.M., Guevar D., Vion, E., Analog, Transmission of TV-Channels on Optical Fibers, with Non-Linearities Correction by Regulated Feedforward, Jan. 9, 1984, pp. 298-304, vol. 12, No. 9, Brussel, BE.
Govind P. Agrawal, Fiber-Optic Communication Systems, 1997, pp. 14-17, Second Edition, Canada.
H.S. Black, Stablized Feed-Back Amplifiers, Feb. 1999, pp. 379-385, vol. 87, No. 2.
Plextex Limited, Case Study RF Power Amplifier Design Feedforward Linearity Correction, pp. 1-2, Great Chesterford, Essex, United Kingdom, 1999.
Edward Ackerman and Charles Cox, Fiber-Optic Technology for Antenna Remoting, Jul. 9, 2001, pp. 1-14, Berkeley, California.

* cited by examiner

*Primary Examiner*—M. R. Sedighian
(74) *Attorney, Agent, or Firm*—Daly, Crowley, Mofford & Durkee, LLP

(57) ABSTRACT

A system having a first optical modulator operates in a non-linear region thereof and fed by: an input radio frequency signal; and, a first optical frequency signal having a wavelength $\lambda_2$. A second optical modulator operates in a linear region thereof and fed by: a fractional portion of the input radio frequency signal phase shifted relative to the input radio frequency signal by $n\pi$ radians where n is an odd integer; and a second different optical frequency signal wavelength $\lambda_1$. A first photodiode is fed by an output of the first optical modulator. A second photodiode is fed by an output of the second optical modulator and a fractional portion of an output of the first optical modulator. An amplifier is fed by the second photodiode. A subtractor is fed by the amplifier and the first photodiode.

12 Claims, 1 Drawing Sheet

OPTICAL LINK

TECHNICAL FIELD

Figure 1:
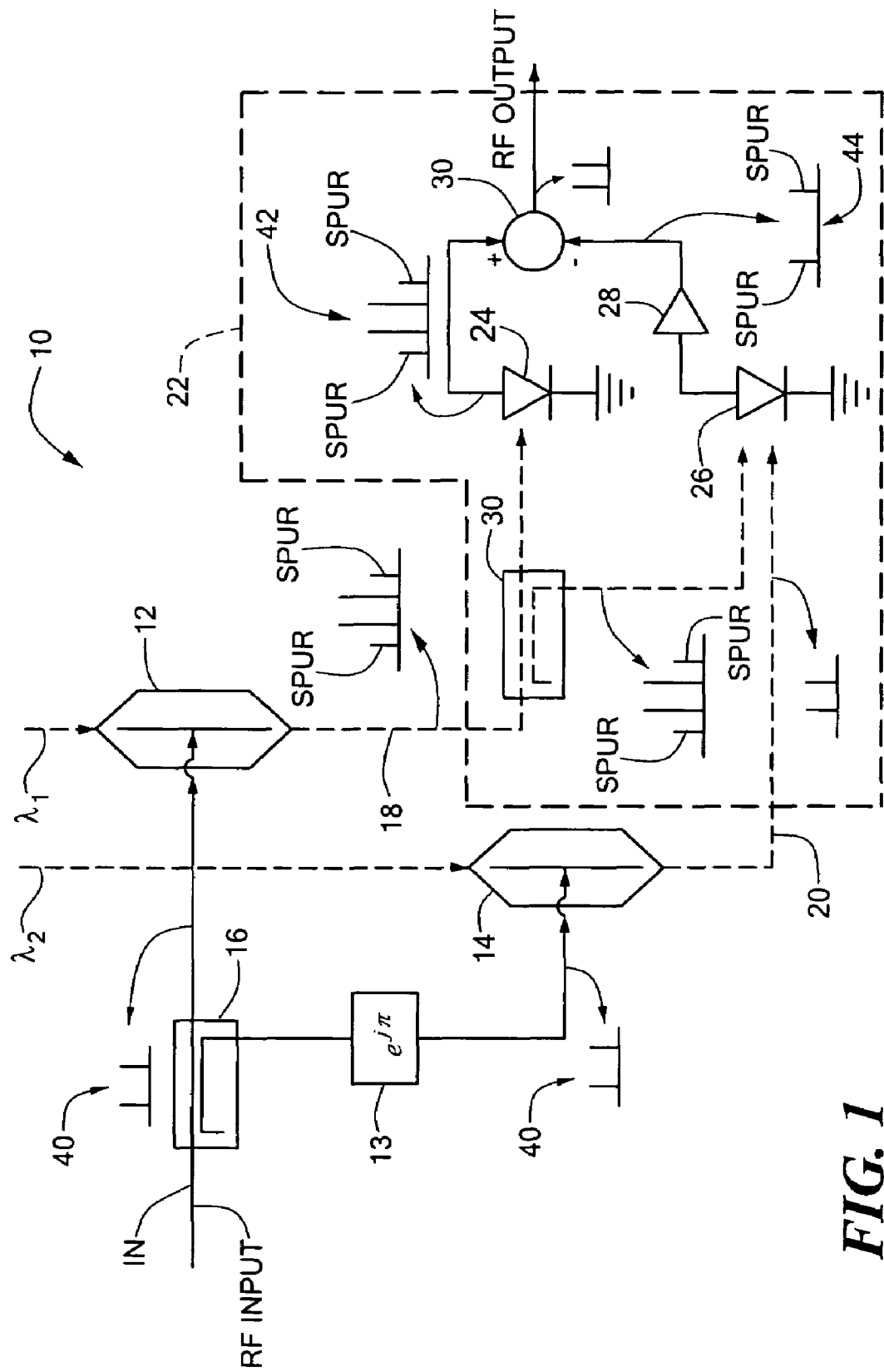

This invention relates generally to optical links and more particularly to analog optical links having high, spur-free dynamic range.

BACKGROUND

As is known in the art, optical links have been used to translate a radio frequency signal to a corresponding optical frequency signal for transmission via an optical transmission media such as a fiber optic cable to a remote receiver and then re-translate such optical frequency signal back to the radio frequency signal at the receiver.

One type of optical link suggested to provide spur-free high dynamic range includes the use of two Mach-Zehnder interferometric modulators in configurations that resulted in the minimization of third-order nonlinear distortion products or the simultaneous minimization of second- and third-order distortion products. The high, spurious-free dynamic range results are however limited to bandwidths of less than 1 GHz. By making use of electro-absorption modulators, it is possible to bias the devices for 3rd or 2nd order distortion reduction, but a compromise is required to address both bandwidth and distortion.

While such links may be useful in some applications, optical links used in the current state of the art have been generally inadequate for radar system applications because such applications require very high, spur-free dynamic range.

SUMMARY

In accordance with the present invention, an optical system is provided having a main transmission link for modulating an input radio frequency signal with a first optical frequency signal to produce a main signal comprising components of the input radio frequency signal translated in frequency by the first optical frequency along with optical frequency spurious signal components. The system includes a feedforward optical link for modulating a portion of the input radio frequency signal with a second optical frequency signal to produce a feedforward signal comprising components of the input radio frequency signal translated in frequency by the second optical frequency. A receiver is fed by the main signal and the feedforward signal for subtracting the optical frequency spurious signal components from the main signal.

With such system, the feedforward optical link provides a method by which a system having linearized precisely over broad bandwidths In one embodiment, a system is provided for translating the frequency of an input radio frequency signal to an optical frequency output signal for transmission via an optical transmission media to a receiver. The receiver re-translates the frequency of such optical frequency signal to a corresponding radio frequency signal. The system includes a main transmission link for modulating the input radio frequency signal with a first optical frequency signal to produce a main signal comprising components of the input signal translated in frequency by the first optical frequency along with optical frequency spurious signal components. A feedforward optical link is provided for modulating a portion of the input radio frequency signal with a second optical frequency signal to produce a feedforward signal comprising components of the input radio frequency signal translated in frequency by the second optical frequency. The receiver: (a) extracts the optical frequency spurious signal components produced by the main transmission link and re-translates the frequency of such extracted optical frequency spurious signal components to radio frequency signal spurious signal components; (b) re-translates the frequency of the components of the main optical frequency and optical frequency spurious signal components of the main signal to radio frequency components; and (c) subtracts the extracted and re-frequency translated optical frequency spurious signal components from the re-translated frequency components of the main signal.

In one embodiment, a system is provided for translating the frequency of an input radio frequency signal having radio frequency components to a corresponding optical frequency output signal for transmission via an optical transmission media then re-translating the frequency of such optical frequency signal back to the input radio frequency signal. The system includes a first modulator, fed by the input radio frequency signal and a first optical frequency signal, such first modulator being driven by the input radio frequency signal into a non-linear region of such first modulator, such first modulator modulating the input radio frequency signal with the first optical frequency signal to produce a main signal comprising components of the input radio frequency signal translated in frequency by the first optical frequency along with optical frequency spurious signal components. A second modulator is provided operating in a linear region thereof and fed by a sample of the input radio frequency signal and a second optical frequency signal for modulating the sample of the input radio frequency signal with the second optical frequency signal to produce a feedforward signal comprising components of the input radio frequency signal translated in frequency by the second optical frequency. A receiver is included having circuitry fed by the main signal and the feedforward signal for: (a) extracting the optical frequency spurious signal components produced by the first modulator and re-translating the frequency of such optical frequency spurious signal components to radio frequency signal spurious signal components; (b) re-translating the frequency of the main signal to a corresponding radio frequency signal; and (c) subtracting the extracted optical frequency spurious signal components from said corresponding radio frequency signal.

In one embodiment, a system is provided having a first modulator operating in a non-linear region thereof fed by: an input radio frequency signal; and a first optical frequency signal having a wavelength $\lambda_1$. The system includes a second modulator operating in a linear region thereof and fed by: a sample of the input radio frequency signal phase shifted relative to the input radio frequency signal by $n\pi$ radians where n is an odd integer; and a second different optical frequency signal wavelength $\lambda_2$. A first photodiode is fed by an output of the first modulator. A second photodiode is fed by an output of the second modulator and a sample of the output of the first modulator. A subtractor is fed by an output from the second photodiode and an output from the first photodiode.

In one embodiment, a method is provided, such method includes modulating an input signal having radio frequency components with a first optical frequency signal to produce a main signal comprising components of the input signal translated in frequency by the first optical frequency along with optical frequency spurious signal components. The method includes modulating a sample of the input signal with a second optical frequency signal to produce a feedforward signal comprising components of the input signal translated in frequency by the second optical frequency. The method extracts the optical frequency spurious signal components produced by the first modulation and translating the frequency of such extracted optical frequency spurious signal components to radio frequency signal spurious signal components. The method includes translating the frequency components of the main signal to corresponding radio frequency components and subtracting the extracted optical frequency spurious signal components from said corresponding radio frequency components.

In one embodiment, a system is provided having a main transmission link through which an input radio frequency signal is translated in frequency to a first optical carrier frequency through intensity modulation in a first optical modulator to produce a main optical frequency signal. The main optical frequency signal includes components of the input radio frequency signal with sideband frequencies around the optical frequency signal along with a spurious radio frequency signal that also appear as sideband frequencies around the optical carrier frequency. The system includes a feedforward optical link having a small portion of the input radio frequency signal (which has been 180 degree phase shifted from that of the main optical frequency signal) through the use of a second optical modulator. The second modulator optical translates the small portion of the input radio frequency signal to sideband frequencies of a second optical carrier frequency. The feedforward optical link carries a feedforward signal with an RF amplitude that is much lower in intensity than that of the main optical frequency signal and therefore generates much less distortion than that generated in the main link. An optical receiver is fed a sample of the main signal and the feedforward signal and generates a difference signal which is used to remove the spurious signal components from the main signal. The two optical frequencies are selected to prevent inadvertent generation of signals in the receiver because of the difference between the two optical frequencies. This is achieved by selecting a difference in the two optical frequencies that is significantly greater than the bandwidth of the receiver (i.e., a frequency difference between the two optical frequencies which is outside of the bandwidth if the receiver).

In one embodiment, a sample of the output of a nonlinear element (i.e., a sample of the output of the first modulator) is subtracted from the input to the nonlinear element (i.e., a sample from the second modulator). If the gain of each link (i.e., the main transmission link and the feedforward signal transmission link) is accounted for correctly, the resulting difference signal is a substantially pure representation of the spurious components generated by the nonlinear element (i.e., the first modulator). By amplifying this difference signal and subtracting it from the remainder of the main signal, a clean replication of the input radio frequency signal is reproduced at the output of the system.

In one embodiment the receiver: (1) extracts the optical frequency spurious signal components produced by the main signal transmission link. The signal is generated through the superposition of the radio frequency signals of the feedfoward and sampled main link, which are retranslated from the sidebands of the optical carrier frequencies through the square-law detection action of a photodiode. (2) re-translates the components of the main signal and optical frequency spurious signal components of the main signal to radio frequency components; and (3) subtracts the extracted radio frequency spurious signal components from the re-translated components of the main signal (both "true" and distortion).

In accordance with another feature of the invention, a system is provided for translating an input signal having radio frequency components to an optical frequency output signal having the radio frequency components of the input signal translated by the optical frequency for transmission via an optical transmission media then re-translating such optical frequency signal back to the radio frequency components in a receiver. The system includes: (1) a first modulator fed by the input signal which is at a level that may create significant distortion and a first optical carrier frequency upon which the input radio frequency signal is impressed through intensity modulation to produce a main signal comprising components of the input frequency signal translated by the first optical frequency along with spurious signal components; and, (2) a second modulator fed by a sample of the input signal and a second optical frequency signal for impressing the portion of the input radio frequency signal onto to produce a feedforward signal comprising components of the input frequency signal translated by the second optical frequency (amplitude modulation (AM) sideband frequencies). The receiver comprises circuitry fed by the main signal and the feedforward signal for: (1) extracting the spurious signal components produced by the first modulator and re-translating such optical frequency spurious signal components to radio frequency signal spurious signal components; (2) re-translating the components of the first optical frequency and optical frequency spurious signal components of the main signal to radio frequency components; and (3) subtracting the extracted optical frequency spurious signal components from the re-translated components of the main signal.

In one embodiment, a system is provided having a first modulator operating in a non-linear region thereof and fed by: an input radio frequency signal; and a first optical frequency signal having a wavelength $\lambda_1$. The system includes a second modulator operating in a linear region thereof and fed by: a sample of the input radio frequency signal phase shifted relative to the input radio frequency signal by $n\pi$ radians where n is an odd integer; and a second different optical frequency signal having a wavelength $\lambda_2$. A first photodiode is fed by an output of the first modulator. A second photodiode is fed by an output of the second modulator and by a sample of the output of the first modulator. An amplifier is fed by the second photodiode. A subtractor is fed by the amplifier and the first photodiode.

In accordance with still another feature of the invention, a method is provided comprising: modulating an input signal having radio frequency components with a first optical frequency signal to produce a main signal comprising components of the input frequency signal translated by the first optical frequency along with optical frequency spurious signal components; modulating a sample of the input signal with a second optical frequency signal to produce a main signal comprising components of the input frequency signal translated by the second optical frequency; extracting the optical frequency spurious signal components produced by the first modulation and translating such optical frequency spurious signal components to radio frequency signal spurious signal components; translating the components of the first optical frequency and optical frequency spurious signal components of the main signal to radio frequency components; and subtracting the extracted optical frequency spurious signal components from the re-translated components of the main signal.

The details of one or more embodiments of the invention are set forth in the accompanying drawings and the description below. Other features, objects, and advantages of the invention will be apparent from the description and drawings, and from the claims.

DETAILED DESCRIPTION

Referring now to the single FIGURE, an optical link 10 is shown to include a first optical modulator 12, here for example a Electro-Absorption Modulator, driven into a nonlinear operating region fed by: an input radio frequency (RF) signal IN; and a first optical frequency signal having a wavelength $\lambda_1$ first optical frequency $f_1=2\pi c/\lambda_1$, where c is the speed of light in the optical fiber. A second optical modulator 14, here also for example a Electro-Absorption Modulator, operates in its linear region and is fed by: (a) a sample, i.e., a fractional, portion of the input radio frequency signal IN, and is phase shifted in phase shifter 13 (or shifted by some other means) relative to the input radio frequency signal IN by $n\pi$ radians where n is an odd integer; (b) and a second different optical frequency signal having a wavelength $\lambda_2$ first optical frequency $f_2=2\pi c/\lambda_2$, where c is the speed of light in the optical fiber.

More particularly, the optical link 10 includes a directional coupler 16 fed by the input radio frequency signal IN. A sample (i.e., fractional portion) of the input radio frequency signal, IN, is phase shifted 180 degrees and then fed to the second modulator 14 along with the second optical frequency signal wavelength $\lambda_2$.

The modulators 12 and 14 are matched modulators thereby ensuring equivalent transfer characteristics. The outputs of the first and second modulators 12, 14 are optical frequency signals indicated by the dotted lines, the solid lines representing RF signals. More particularly, the input radio frequency signal IN is translated in frequency by first modulator 12 to the first optical carrier frequency signal $\lambda_1$ through intensity modulation in the first optical modulator 12. The output from the first modulator 12 is thus a "main" optical signal comprising components of the input radio frequency signal IN, which appear as sidebands around the optical signal, along with a spurious radio frequency signal which also appear as sidebands around the optical carrier frequency. The output of the first optical modulators 12 is sometimes referred to as a main transmission or optical link 18.

A feedforward optical link 20 is provided with the output of the second optical modulator 14 which transmits a sample (i.e., fractional portion) of the input radio frequency signal IN, after having been 180-degree phase shifted relative to the input signal to the second optical modulator 14. The second modulator 14 translates the frequency of the input radio frequency signal IN to sideband frequencies of the second optical carrier signal $\lambda_2$. Due to the fractional nature of the RF signal provided to the second modulator 14, significantly less distortion is lower than that of the main link.

These optical frequency signals in the main link 18 and the feedforward link 20 are fed via fiber optic cables, not numbered, to an optical receiver 22. The optical frequency signal carried by main transmission link 18 is sometimes herein referred to as the main signal. The optical frequency signal carried by feedforward link is sometimes herein referred to as the feedforward signal and provides a feedforward signal to the receiver 22. Any dispersion effects resulting from differing delays in the two fibers are overcome by adjusting the length of the two lengths of fiber.

The optical receiver 22 is fed the main signal and the feedforward signal. As will be described in more detail below, the receiver 22 creates a difference signal, which is used to remove the spurious signal components from the main signal. The two optical frequencies, $\lambda_1$ and $\lambda_2$ are selected to prevent generation in the receiver 22 due to the difference between the two optical frequency links. This is accomplished by selecting a difference in frequencies $\lambda_1$ and $\lambda_2$ that is significantly greater than the bandwidth of the receiver 22.

More particularly, the receiver 22 includes a first photodiode 24, a second photodiode 26, an amplifier 28 and a subtractor 30. More particularly, the second photodiode 26 is fed by the output of the second modulator 14 and a sample (i.e., a fractional portion) of an output of the first modulator 12. More particularly, a factional portion, or sample, of the output of the first modulator 12 is fed to the second photodiode 26 through a directional coupler 30. Thus, the signal generated through the superposition of the radio frequency signals of the feedfoward link 20 and sampled main link 18, are retranslated from the sidebands of the optical carrier frequencies through the square-law detection action of the second photodiode 26. The first photodiode 24 is fed by the first modulator 12; more particularly by the major portion of the output of the directional coupler 30. The amplifier 28 is fed by the second photodiode 26. The subtractor 30 is fed by the amplifier 28 and the second photodiode 26. The fraction of sampled signals in the RF directional coupler 16, optical directional coupler 18, the gain of the amplifier 28, and laser powers are adjusted in order to ensure the resulting OUT signal is free of distortion.

The frequency spectrum of the input radio frequency signal IN is represented for illustration and explanation purposes by numerical designation 40. It is noted that the frequency spectrum of the signals produced by the directional coupler 16 is not changed; however the phase of the spectrum is, as noted above, shifted 180 degrees before being fed to the second modulator 14.

The effect of modulator 12 is to translate the frequency spectrum of the output of the directional coupler 16 by the optical frequency of the first optical frequency signal having the wavelength to the $\lambda_1$. It is noted however that because the first modulator 12 driven by the input radio frequency signal to operate in the nonlinear region to provide maximum output power, such nonlinear operation also produces unwanted spurious frequency components shown by the numerical designation 42.

The major portion of the output of the first modulator 12 and carried in the main link 18 is fed, as noted above, to the first photodiode 24. Thus, the main transmission link 18 carries: (1) the spurious optical frequency components produced by modulator 12 operating in the non-liner region; and, (2) the frequency components of the components of the input signal IN translated in frequency by $f_1$ The first photodiode 24 provides at the output thereof both the spurious optical frequency components produced by modulator 12 operating in the non-liner region; and the frequency components of the components of the input signal IN translated in frequency by $f_1$. The frequency spectrum of the signals produced by the first photodiode 24 is shown by the numerical designation 42.

A small sample of the signal produced by the first modulator 12 provided by directional coupler 30, is fed, as noted above, to the second photodiode 26 along with the output of the second modulator 14. Thus, the feedforward transmission link 20 carries: (1) the frequency components of the input signal IN translated in frequency by $f_1$; (2) the spurious optical frequency components produced by modulator 12 operating in the nonlinear region; and, (3) the frequency components of the components of the input signal IN translated in frequency by $f_2$ The second photodiode 26 provides at the output thereof only the spurious signals translated to radio frequency. Thus, the signal produced by the second photodiode 26 is, in effect, an error signal representative of the spurious frequency components produced by the nonlinear operation of the first modulators 12. The frequency spectrum of the signals produced by the second photodiode 26 is shown by the numerical designation 44.

Thus, the second photodiode 26 extracts the optical frequency spurious signal components produced by the main transmission link 18 and re-translates the frequency of such extracted optical frequency spurious signal components to radio frequency signal spurious signal components. The first photodiode 24 re-translates the frequency of the components of the main optical frequency and optical frequency spurious signal components of the main signal to radio frequency components. The subtractor 30 subtracts the extracted resulting spurious signal components produced by the second photodiode 26 from the re-translated frequency components of the main signal produced by the first photodiode 24.

The optical detector works by creating electron-hole pairs from absorbed photons in the presence of an electric field. Each absorbed photon creates an electron hole-pair (i.e., more optical power=more photons=more current). By generating the electron-hole pairs in the presence of an electric field a current is created. Since the current (rather than the power) of the optical detector is proportional to the input optical power this is a square law detector. With a single input signal (one input optical wavelength) the resulting current will be proportional to the AM modulation of the input optical signal. In the case of the main signal this includes spurious optical signals generated by the electro-optical modulation process. The optical sidebands would be translated to RF in the optical receiver (main and spurious). Similarly, the optical sidebands in the feedforward signal, which have little distortion, will be translated to the RF regime. In other words, the detector will generate an RF current from each of the optical signals fed into it. Since these currents are now superimposed in the diode and are at the same frequency the will constructively or destructively interfere with one another. If the phasing is set up correctly, it will lead to destructive interference. The difference frequency of the optical wavelengths is selected to be well beyond the passband of the detector so that no heterodyning can occur. By ensuring a large difference frequency, any current that is generated by this is shorted out due to the parasitic capacitance and transit time of the detector. So the difference frequency is not supported. If the two wavelengths of light were selected to be near each other (within the pass band of the receiver) there would be a mix product created by the difference between the two signals. This would be an undesirable selection because it creates another distortion product.

Destructive interference is created by making sure the two RF signals are 180 degrees out of phase with one another. Thus, the two RF signals are 180 degrees out of phase at the input with the phase shift. This could also be accomplished at the input of the receiver; however a third photo detector would be required at the output to perform a phase shift. It is noted that this phase shift could be incorporated in the amplifier. It is noted that use of a third photodiode offers additional design flexibility. More particularly, a third wavelength, while potentially increasing difficulty to manage but may lend flexibility to the device.

Thus, with such an arrangement, an optical system is provided having a main transmission link for modulating an input radio frequency signal IN with a first optical frequency signal here of wavelength $\lambda_1$ to produce a main signal comprising components of the input frequency signal IN translated by the first optical frequency $f_1=2\pi c/\lambda_1$, where c is the speed of light in the optical fiber, along with optical frequency spurious signal components. A feedforward optical link is provided for modulating a portion of the input radio frequency signal IN with a second optical frequency signal $f_2=2\pi c/\lambda_2$ to produce a main signal comprising components of the input frequency signal translated by the second optical frequency. The receiver is fed by the main signal and the feedforward signal and having the first photodiode 24, the second photodiode 26, the amplifier 28 and the subtractor 30 subtracts extracted optical frequency spurious signal components from the main signal.

Thus, the receiver 22 includes circuitry fed by the main signal and the main signal for: extracting the optical frequency spurious signal components produced by the first modulator and re-translating such optical frequency spurious signal components to radio frequency signal spurious signal components; re-translating the components of the first optical frequency and optical frequency spurious signal components of the main signal to radio frequency components; and subtracting the extracted optical frequency spurious signal components from the re-translated components of the main signal.

The wavelengths $\lambda_1$ and $\lambda_2$ must be chosen so that the do not heterodyne in the photo-receiver. That is to say, the difference between the two optical frequencies must be significantly greater than the bandwidth of the photo receiver. The RF power of the signal routed to the feed forward arm is considerably lower than that fed to the main arm. It therefore creates much lower distortion in the electro-optic modulator than in the main arm. The feed forward signal (which has been inverted in the electrical domain) and a fraction of the signal in the main arm are fed to a single photo-receiver in order to create an error signal. The coupled fraction of the main arm signal depends on the amount of signal originally passed to the feed forward arm and the optical power at $\lambda_1$. The resulting error signal is fed into an error amplifier which boosts the distortion signal to that of the distortion carried in the main arm. The resulting error signal is subtracted from the main arm signal in order to create a relatively distortion free output signal.

The feed forward optical link configuration could be implemented with additional differential optical signals in order to remove common mode noise (relative intensity noise). Compensating for delay between the main and feed forward arms may be handled through additional length of fiber. The photo-receiver 22 would be best implemented with monolithically integrated photo-receivers to ensure matched components and good integration with differential amplifiers, etc. Similarly, the modulators should be matched components. Electro-absorption modulators may be necessary for this.

A number of embodiments of the invention have been described. Nevertheless, it will be understood that various modifications may be made without departing from the spirit and scope of the invention. Accordingly, other embodiments are within the scope of the following claims.

What is claimed is:

1. A system for translating the frequency of an input radio frequency signal to an optical frequency output signal for transmission via an optical transmission media to a receiver, such receiver re-translating the frequency of such optical frequency signal to a corresponding radio frequency signal, comprising:

a main transmission link for modulating the input radio frequency signal with a first optical frequency signal having a first optical frequency to produce a main signal comprising components of the input signal translated in frequency by the first optical frequency along with optical frequency spurious signal components;

feedforward optical link for modulating a portion of the input radio frequency signal with a second optical frequency signal having a second different optical frequency to produce a feedforward signal comprising components of the input radio frequency signal translated in frequency by the second optical frequency;

wherein the receiver: (a) extracts the optical frequency spurious signal components produced by the main transmission link and re-translates the frequency of such extracted optical frequency spurious signal components to radio frequency signal spurious signal components; (b) re-translates the frequency of the components of the main optical frequency and optical frequency spurious signal components of the main signal to radio frequency components; and (c) subtracts the extracted and re-frequency translated optical frequency spurious signal components from the re-translated frequency components of the main signal.

2. The optical system recited in claim 1 wherein:
the main transmission link includes a first modulator, fed by the input radio frequency signal and the first optical frequency, the first modulator being driven by the input radio frequency signal into a non-linear region of such first modulator, such first modulator modulating the input radio frequency signal with the first optical frequency signal to produce a main signal comprising components of the input radio frequency signal translated in frequency by the first optical frequency along with optical frequency spurious signal components;
the feedforward optical link includes a second modulator operating in a linear region thereof and fed by a sample of the input radio frequency signal and a second optical frequency for modulating the second optical frequency signal with a sample of the input radio frequency signal to produce a feedforward signal comprising components of the input radio frequency signal translated in frequency by the second optical frequency.

3. The optical system of claim 2, wherein the first optical frequency has a wavelength $\lambda_1$, the second optical frequency has a wavelength $\lambda_2$, and the sample of the input radio frequency signal fed to the second modulator is phase shifted relative to the input radio frequency signal fed to the first modulator by $n\pi$ radians where n is an odd integer.

4. The optical system of claim 2, wherein the only inputs to the second modulator are the sample of the input radio frequency signal and the second optical frequency.

5. A system for translating the frequency of an input radio frequency signal having radio frequency components to a corresponding optical frequency output signal for transmission via an optical transmission media then re-translating the frequency of such optical frequency signal back to the input radio frequency signal, comprising:
a first modulator, fed by the input radio frequency signal and a first optical frequency signal having a first optical frequency, such first modulator being driven by the input radio frequency signal into a non-linear region of such first modulator, such first modulator modulating the input radio frequency signal with the first optical frequency signal to produce a main signal comprising components of the input radio frequency signal translated in frequency by the first optical frequency along with optical frequency spurious signal components;
a second modulator operating in a linear region thereof and fed by a sample of the input radio frequency signal and a second optical frequency signal having a second different optical frequency for modulating the sample of the input radio frequency signal with the second optical frequency signal to produce a feedforward signal comprising components of the input radio frequency signal translated in frequency by the second optical frequency;
a receiver comprising circuitry fed by the main signal and the feedforward signal for:

(a) extracting the optical frequency spurious signal components produced by the first modulator and re-translating the frequency of such optical frequency spurious signal components to radio frequency signal spurious signal components;

(b) re-translating the frequency of the main signal to a corresponding radio frequency signal; and (c) subtracting the extracted optical frequency spurious signal components from said corresponding radio frequency signal.

6. A system, comprising:
a first modulator operating in a non-linear region thereof and fed by: an input radio frequency signal; and a first optical frequency signal having a wavelength $\lambda_1$;
a second modulator operating in a linear region thereof and fed by: a sample of the input radio frequency signal phase shifted relative to the input radio frequency signal by $n\pi$ radians where n is an odd integer; and a second different optical frequency signal wavelength $\lambda_2$;
a first photodiode fed by an output of the first modulator;
a second photodiode fed by an output of the second modulator and a sample of the output of the first modulator;
a subtractor fed by an output from the second photodiode and an output from the first photodiode.

7. A method, comprising:
modulating an input signal having radio frequency components with a first optical frequency signal having a first optical frequency to produce a main signal comprising components of the input signal translated in frequency by the first optical frequency along with optical frequency spurious signal components;
modulating a sample of the input signal with a second optical frequency signal having a second different optical frequency to produce a feedforward signal comprising components of the input signal translated in frequency by the second optical frequency;
extracting the optical frequency spurious signal components produced by the first modulation and translating the frequency of such extracted optical frequency spurious signal components to radio frequency signal spurious signal components;
translating the frequency components of the main signal to corresponding radio frequency components; and
subtracting the extracted optical frequency spurious signal components from said corresponding radio frequency components.

8. An optical system, comprising:
a main transmission link for modulating an input radio frequency signal with a first optical frequency signal having a first optical frequency to produce a main signal comprising components of the input radio frequency signal translated in frequency by the first optical frequency along with optical frequency spurious signal components;
a feedforward optical link for modulating a portion of the input radio frequency signal with a second optical frequency signal having a second different optical frequency to produce a feedforward signal comprising components of the input radio frequency signal translated in frequency by the second optical frequency;
a receiver fed by the main signal and the feedforward signal for subtracting the optical frequency spurious signal components from the main signal; and wherein:

the main optical signal comprising components of the input signal translated in frequency by the first optical frequency along with optical frequency spurious signal components;

and wherein the receiver is configured to:

(a) combine a portion of the main optical signal with the feedforward optical signal to create a third optical signal;

(b) use the third optical signal to extract the optical frequency spurious signal components produced by the main transmission link through a first down conversion process to translate the frequency of such extracted optical frequency spurious signal components to radio frequency signal spurious signal components;

(c) re-translate the frequency of the components of the main optical frequency and optical frequency spurious signal components of the main signal to radio frequency components through a second down conversion process; and (d) subtract the extracted and re-frequency translated optical frequency spurious signal components from the re-translated frequency components of the main optical signal.

9. An optical system, comprising:

a main transmission link for modulating an input radio frequency signal with a first optical frequency signal having a first optical frequency to produce a main signal comprising components of the input radio frequency signal translated in frequency by the first optical frequency along with optical frequency spurious signal components;

a feedforward optical link for modulating a portion of the input radio frequency signal with a second optical frequency signal having a second different optical frequency to produce a feedforward signal comprising components of the input radio frequency signal translated in frequency by the second optical frequency;

a receiver fed by the main signal and the feedforward signal for subtracting the optical frequency spurious signal components from the main signal; and wherein:

the main transmission link includes a first modulator, fed by the input radio frequency signal and the first optical frequency, the first modulator being driven by the input radio frequency signal into a non-linear region of such first modulator, such first modulator modulating the input radio frequency signal with the first optical frequency signal to produce a main signal comprising components of the input radio frequency signal translated in frequency by the first optical frequency along with optical frequency spurious signal components;

the feedforward optical link includes a second modulator operating in a linear region thereof and fed by a sample of the input radio frequency signal and a second optical frequency for modulating the second optical frequency signal with a sample of the input radio frequency signal to produce a feedforward signal comprising components of the input radio frequency signal translated in frequency by the second optical frequency.

10. The optical system of claim 9, wherein the first optical frequency has a wavelength $\lambda_1$, the second optical frequency has a wavelength $\lambda_2$, and the sample of the input radio frequency signal fed to the second modulator is phase shifted relative to the input radio frequency signal fed to the first modulator by $n\pi$ radians where n is an odd integer.

11. The optical system of claim 9 wherein, the receiver comprises:

a first photodiode fed by an output of the first modulator;

a second photodiode fed by an output of the second modulator and a sample of the output of the first modulator;

a subtractor fed by an output from the second photodiode and an output from the first photodiode.

12. The optical system of claim 9, wherein the only inputs to the second modulator are the sample of the input radio frequency signal and the second optical frequency.

\* \* \* \* \*

UNITED STATES PATENT AND TRADEMARK OFFICE
CERTIFICATE OF CORRECTION

PATENT NO. : 7,657,189 B2
APPLICATION NO. : 11/016086
DATED : February 2, 2010
INVENTOR(S) : Robert E. Leoni It is certified that error appears in the above-identified patent and that said Letters Patent is hereby corrected as shown below:

Column 1, line 49 delete "such system," and replace with --such a system,--.

Column 3, line 15 delete "appear" and replace with --appears--.

Column 3, line 18 delete "180 degree" and replace with --180 degrees--.

Column 3, lines 20-21 delete "second modulator optical" and replace with --second optical modulator--.

Column 3, line 37 delete "if" and replace with --of--.

Column 3, lines 53-54 delete "feedfoward" and replace with --feedforward--.

Column 3, line 56 delete "photodiode. (2)" and replace with --photodiode; (2)--.

Column 4, line 8 delete "; and, (2)" and replace with --; and (2)--.

Column 4, line 11 delete "onto to" and replace with --to--.

Column 5, line 33 delete "modulators" and replace with --modulator--.

Column 5, line 38 delete "180-degree" and replace with --180 degrees--.

Column 6, line 2 delete "factional" and replace with --fractional--.

Column 6, line 6 delete "feedfoward" and replace with --feedforward--.

Column 6, line 7 delete "retranslated" and replace with --re-translated--.

Column 6, line 28 delete "wavelength to the $\lambda_1$" and replace with -- wavelength $\lambda_1$--.

Column 6, line 38 delete "non-liner" and replace with --non-linear--.

Signed and Sealed this

Twenty-eighth Day of September, 2010

David J. Kappos
*Director of the United States Patent and Trademark Office*

Column 6, line 43 delete "non-liner" and replace with --non-linear--.

Column 6, line 55 delete "non-liner" and replace with --non-linear--.

Column 6, line 62 delete "non-liner" and replace with --non-linear--.

Column 7, line 29 delete "the" and replace with --they--.

Column 8, line 14 delete "the" and replace with --they--.